(No Model.)

L. GENTY.
HOT AIR MOTOR ENGINE.

No. 461,930.

5 Sheets—Sheet 1.

Patented Oct. 27, 1891.

WITNESSES

INVENTOR (No Model.)  L. GENTY.  5 Sheets—Sheet 2.
HOT AIR MOTOR ENGINE.

No. 461,930.  Patented Oct. 27, 1891.

WITNESSES  INVENTOR (No Model.)  L. GENTY.  5 Sheets—Sheet 3.
HOT AIR MOTOR ENGINE.
No. 461,930.  Patented Oct. 27, 1891.
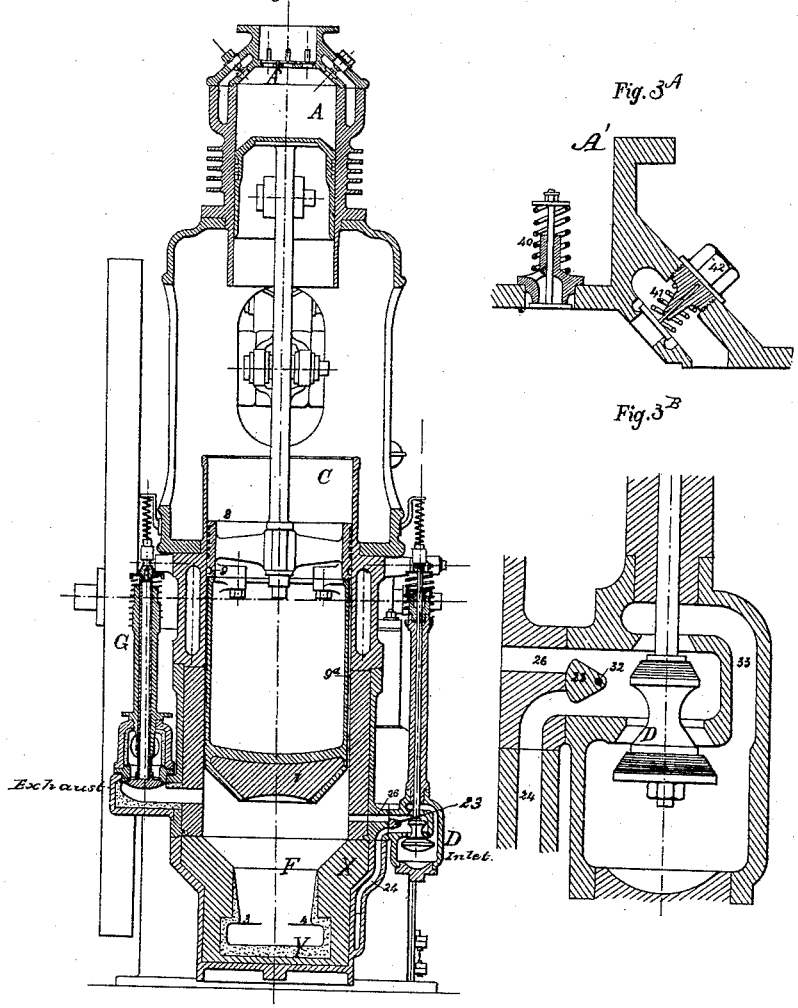

(No Model.) 5 Sheets—Sheet 4.
L. GENTY.
HOT AIR MOTOR ENGINE.
No. 461,930. Patented Oct. 27, 1891.
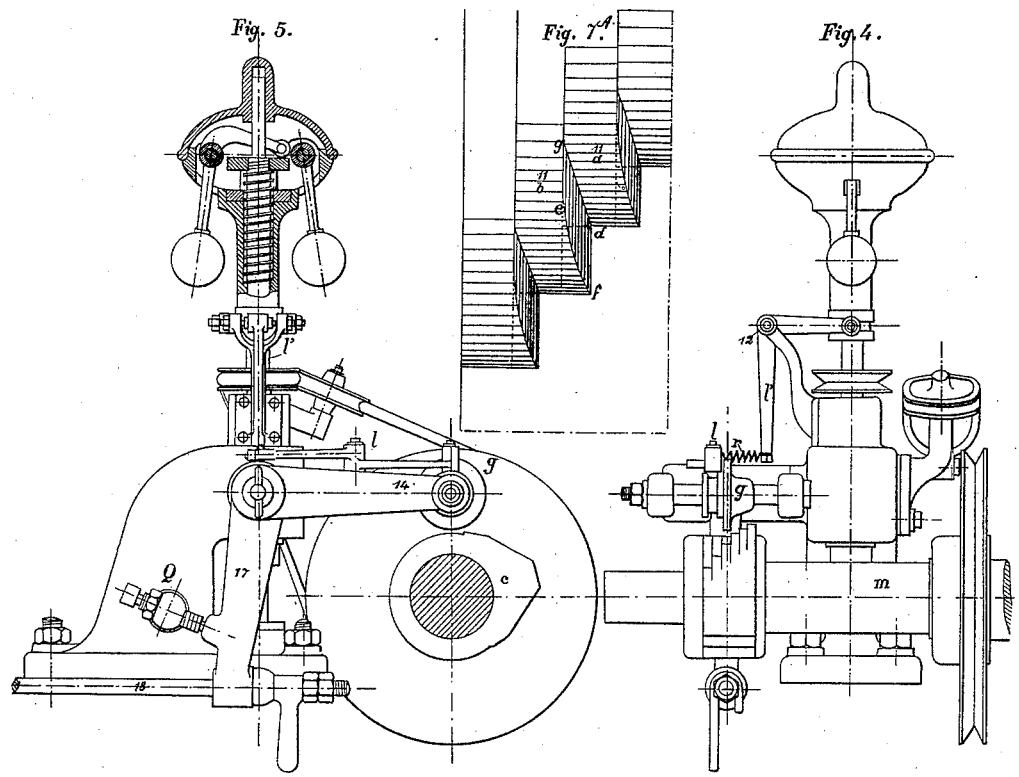
Fig. 5. Fig. 7.A Fig. 4.
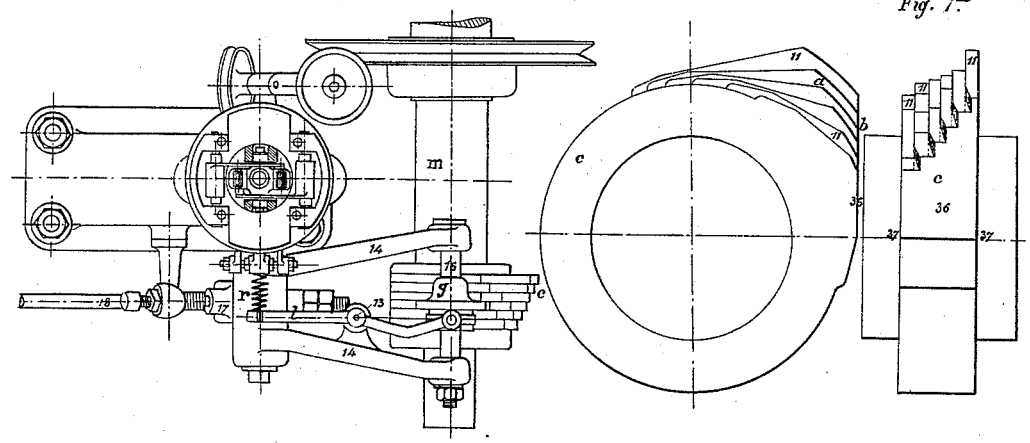
Fig. 6. Fig. 7. Fig. 7.B
WITNESSES INVENTOR (No Model.) L. GENTY. 5 Sheets—Sheet 5.
HOT AIR MOTOR ENGINE.

No. 461,930. Patented Oct. 27, 1891.

WITNESSES

INVENTOR
Lucien Genty

United States Patent Office.

LUCIEN GENTY, OF TOURS, FRANCE.

HOT-AIR MOTOR-ENGINE.

SPECIFICATION forming part of Letters Patent No. 461,930, dated October 27, 1891.

Application filed October 4, 1889. Serial No. 325,990. (No model.) Patented in England September 21, 1889, No. 14,927; in Belgium September 21, 1889, No. 87,819; in France September 21, 1889, No. 200,900; in Germany September 21, 1889, No. 52,477, and in Austria-Hungary July 15, 1890, No. 41,263 and No. 29,881.

*To all whom it may concern:*

Be it known that I, LUCIEN GENTY, a citizen of France, residing at Tours, in the Department of the Indre-et-Loire, have invented a new and useful Improvement in Hot-Air Motor-Engines, (patented in England September 21, 1889, No. 14,927; in Belgium September 21, 1889, No. 87,819; in France September 21, 1889, No. 200,900; in Austria-Hungary July 15, 1890, No. 41,263 and No. 29,881, and in Germany September 21, 1889, No. 52,477,) of which the following is a specification.

This invention relates to certain improvements in hot-air motor-engines, and, although this particular description of motors only is here indicated, these improvements are not restricted to those motors, as they may be applied to any other types of engines to which they are applicable; nor do I restrict myself to the precise details shown in the accompanying drawings, the same being capable of many variations without departure from the nature of this invention.

The improvements according to this invention consist in a novel arrangement of the furnace, which enables the fuel to be burned without the use of a grate, and thereby obviates obstruction; in a fuel-supply apparatus, and in a novel contrivance whereby dust is prevented from coming into contact with the portion of the cylinder subject to friction and with the packing.

The accompanying drawings, which form a part of this specification, illustrate a hot-air motor-engine provided with my improvements, the same letters and numerals of reference designating the same parts in all the figures.

Figure 1:
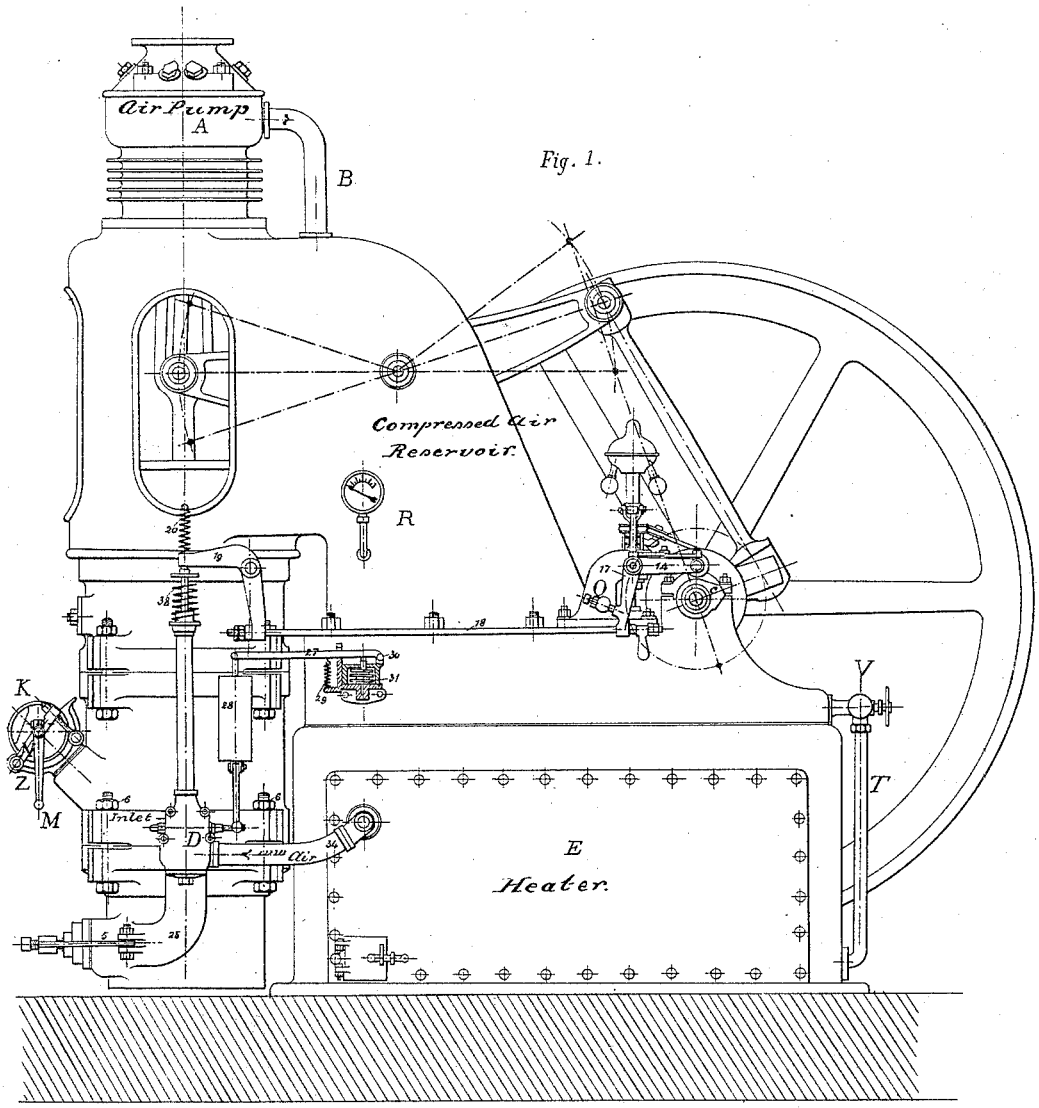
Figure 2:
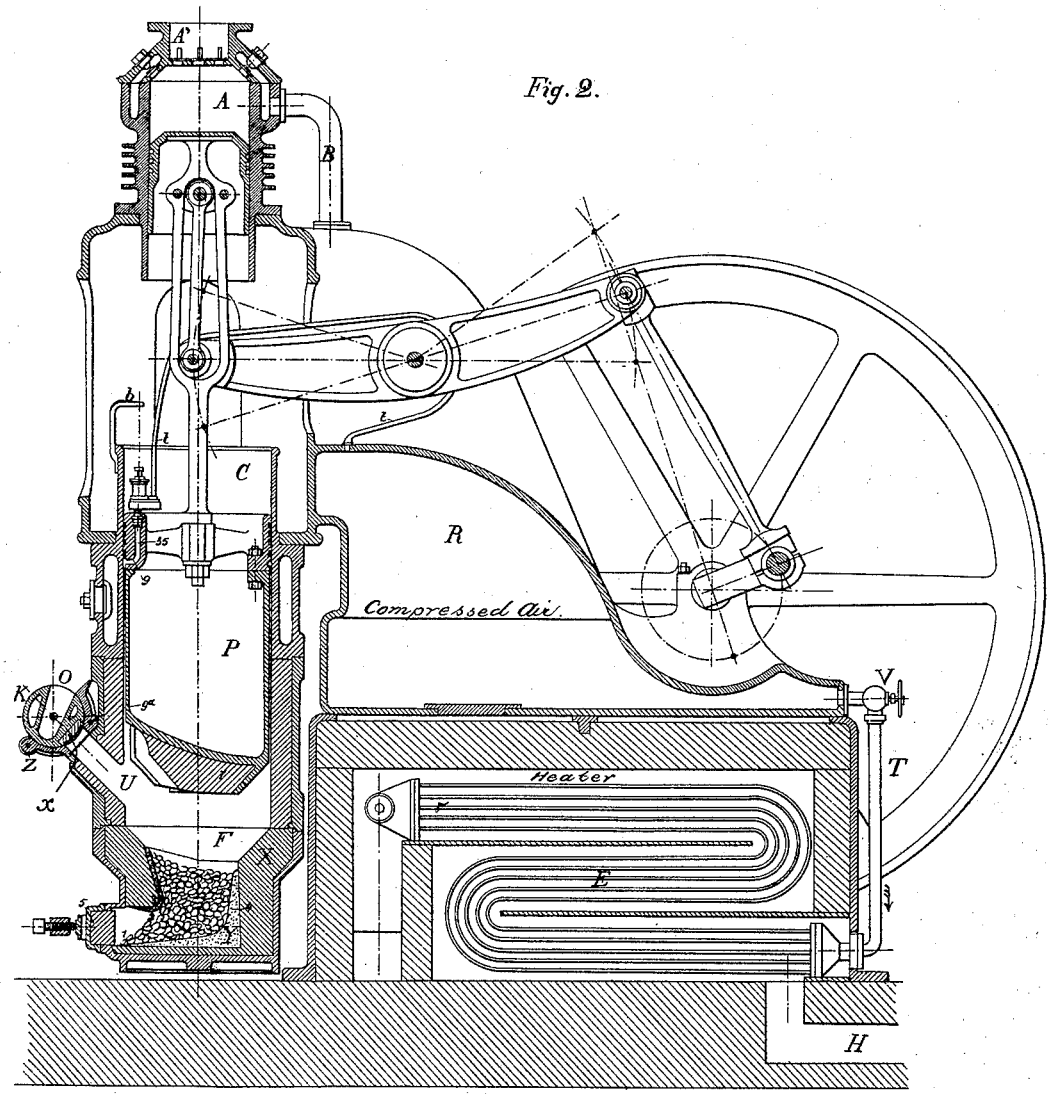
Figure 9:
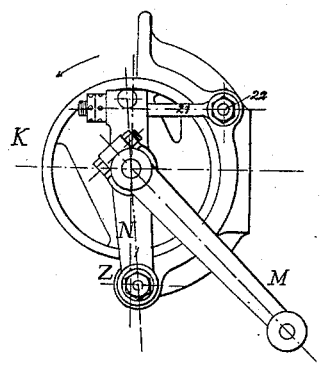
Figure 10:
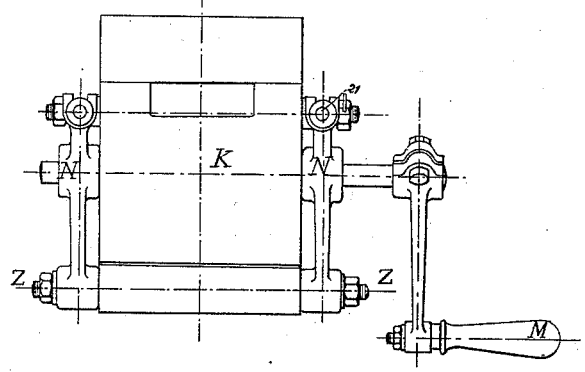
Figure 11:
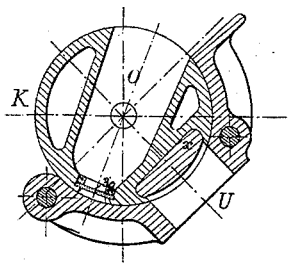
Figure 8:
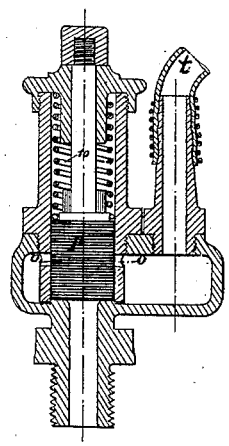

Figure 1 is a side elevation, Fig. 2 a longitudinal vertical section, and Fig. 3 a cross-section, (through the axis of the cylinder,) of the improved engine. Figs. 3$^A$ and 3$^B$, respectively, are detail views of the valves of the air-pump and air-distributer. Figs. 4 and 5, respectively, are a front view and a side view, partly in cross-section, of the governor. Fig. 6 is a plan view of the same; Fig. 7, a detail view of the cam acting upon the pulley which operates the admission-valve. Fig. 7$^A$ is a side elevation; and Fig. 7$^B$ is a detail view, on an enlarged scale, of the said cam. Fig. 8 is a detail view, also on an enlarged scale, of the device for forcing pure air between the body of the cylinder and the piston in order to prevent dust from reaching the portions of the piston-rings and cylinder subject to friction. Figs. 9, 10, and 11 are detail views, on an enlarged scale, of the fuel-supply apparatus.

The engine operates in the following manner: Air is sucked in from the surrounding atmosphere by the pump A and is forced through the pipe B into the chamber R. It passes from this chamber through the valve V and pipe T into the heater E, formed of a number of tubes, and being heated by the escape-gases circulating around the said tubes. The air heated by passing through the said tubes passes thence through the pipe or passage 34 to the admission-valve D, by which it is distributed in the furnace F. After being further heated in the furnace the air flows into the motor-cylinder and the piston thereof is operated upon by the hot gases, which thereafter escape through the exhaust-valve G, internally lined with fire-clay into the casing of the tubular heater E, and thence around the tubes therein and through the outlet H to the external atmosphere.

I will now proceed to describe in succession the improvements in the various parts of the motor-engine according to this invention.

The furnace consists of fire-proof brick-work X, inclosed in a metal casing. The fuel is, by the arrangement hereinafter described, enabled to burn without a grate. The inner walls of the furnace are so arranged as to naturally form a declivity 1 2. This result may be obtained, for example, by means of a contraction 3 4, about midway between the top and bottom of the furnace, and by widening its lower portion. (See Fig. 3.) The air upon reaching the declivity thus formed in the widened part of the furnace is distributed throughout the mass of fuel, which presents to it a large open surface and it is thereby sufficiently heated. By such means the grate, which in engines of this description generally demands constant attendance and not infrequently becomes unfit for use, can be dispensed with. The fuel is entirely consumed without necessitating any attendance, and the deposit of clinker which forms at the bottom of the furnace in no way interferes with the air-supply and can be easily removed when the engine is at rest. These results are exceedingly important, for the difficulty of keeping up and attending to the fire has hitherto proved one of the main impediments to the more general use of hot-air engines.

The furnace may be of a square or rectangular shape, and the extent of the declivity formed by the fuel will vary accordingly. The parts in contact with the fuel are lined with another layer of fire-proof material Y. This secondary lining can be kept in repair either by working through the furnace-door 5 (for small repairs) or by taking the furnace to pieces, (when the whole of the lining is to be renewed.) For the latter purpose the nuts 6 6 are unscrewed whereupon the metal case inclosing the furnace can be removed.

Fuel is supplied to the furnace by means of the apparatus shown at O in the sectional view, Fig. 2, and also on an enlarged scale in Figs. 9, 10, and 11. This apparatus consists of a cylinder K, revolving in a semi-cylindrical piece, against which it is held by two levers N, pivoted on the spindle Z and fixed by means of bolts 21, engaging with the forked tops of the levers N and oscillating at 22. After a charge of fuel is placed in the space O a rotary motion is imparted to the cylinder K, either by turning the handle M or by means of gear from the main shaft. This brings the fuel in front of the channel U and it then descends into the furnace.

A hole 39, provided with a glass plate, serves for the inspection of the furnace when the fuel-supply apparatus assumes the position above described. To moderate the action of heat upon the cylinder K, it is protected by a refractory covering at $x$, which is applied in the hollow space provided for the purpose at the part of the cylinder K which is opposite the entrance of the channel U when the said cylinder is in the normal position shown in Figs. 2 and 11.

To inspect the top of the furnace or the channel U or to light the fire, the cylinder K should be removed from its position. This is done by simply raising the bolts 21 from the forked tops of the levers N, which levers can then be turned on their spindles Z. The cylinder K then drops and remains suspended from the levers N. The apparatus is moved to this position both for lighting the fire and during the periods of discontinuance of operations. The piston P is hollow and is provided at its lower portion—i. e., at the part which comes in contact with the hot gases—with a refractory covering. Its upper end is fitted with segments 8, forming an air-tight packing. At the base of these segments a groove 9 is provided to admit a current of pure air coming direct from chamber R through the flexible tube $t$.

During the compression and admission of air into the furnace and the expansion the heated gas, carrying the dust with it, has a tendency to escape through the packing, and thereby to damage it and the surface of the cylinder by subjecting them to friction. To obviate this the apparatus shown in Fig. 8 is provided. It is shown in position at the end of the tube $t$ in Fig. 2. As soon as an appreciable degree of pressure is reached in the cylinder the small piston $p$ (connected by the channel 35 with the groove 9 underneath the packing) rises somewhat, and thus opens the orifices $o$, permanently connected with the compressed-air chamber R through the tube $t$, and the compressed air from the said chamber R then passes into the groove 9, and thence forms a downward blast toward the furnace and into the annular space $9^a$, provided between the piston attachment and the cylinder, whereby the dust is prevented from coming into contact with the frictional parts of the cylinder and packing. At the completion of the upward stroke of the piston P the exhaust takes place, and at the same time the piston $p$ is closed by coming against the projection $b$, fixed to the cylinder. The admission of air into the groove 9 is thus interrupted during the exhaust. A spiral spring 10 prevents the piston $p$ from rising during the whole of this period, owing to the effect of the counter-pressure caused by the escape.

The air-pump A is arranged in line with the cylinder C and is surrounded by a cover or cap carrying all the suction and force valves arranged in such a manner as to provide for inspection. The valves may be adjusted while in position, or, if desirable, they may be taken out after removing the seating A'. The suction takes place through valves 40, Fig. $3^A$, and the forcing through valves 41, the former being accessible direct. To inspect the valves 41 the plugs 42 will be unscrewed.

The governing device for variable expansion consists as follows: The main or driving shaft is provided with a cam $c$, a plan and elevation of which are shown, respectively, in Figs. 7 and $7^A$. It is by this cam that the admission-valve is opened by acting on a roller $g$. The said cam $c$ is for this purpose provided with a series of offsets or steps 11, so arranged that the admission-valve always opens at the instant when the piston-stroke takes place, but does not close till after a more or less protracted space of time, according as the roller $g$ is rolling on one or the other offset or step of the cam. The motion of the said roller to bring it into position over the respective offsets or steps is obtained by its connection with the centrifugal governor, such connection being formed by the two levers $ll'$ and spiral spring $r$. As the balls of the governor rise or fall the bell-crank lever $l'$ turns on its center 12, and thereby either contracts or expands the spring $r$, which in its turn causes the lever $l$ to turn on its pivot 13, and thus carry the roller *g* onto the proper offset or step of the cam *c*. The moment the roller *g* reaches the rising surface 36—that is, just when it has passed edge 37—it is raised and thereby allows the admission-valve to open. When the roller *g* reaches the spot where offsets or steps meet which terminate the rising surface 36, Figs. 7 and 7ᴬ, it encounters an inclined surface *d e f g*, Fig. 7ᴬ, which shunts it transversely to cam *c* and forces it down scale 11ᵇ (for example) should it slide off line *d f*. If, on the contrary, the roller has been allowed to remain on said line *d f*, it becomes firmly settled upon step 11ᵃ and is no longer liable to slip down upon step 11ᵇ toward the end of the piston-stroke. When the roller *g* is raised by the projection of the cam, it carries the arms 14 up with it, which hold the shaft 16 on which pulley *g* is mounted to slide. The arms 14 are connected with the arm 17, which pulls or releases the rod 18, and thus through the medium of the bell-crank lever 19 opens or closes the balanced admission-valve D. A spiral spring 20, Fig. 1, maintains the strain on the lever 19, rod 18, and three-armed lever 17 14, while the spring 38 tends to keep the valve D closed. The stop Q, suitably adjusted, prevents the roller *g* from bearing against the circular portion of the cam, its bearing only taking place when it meets the projections, offsets, or steps of the cam. The result is that no resistance prevents the governor from moving the roller *g* so long as the latter is not in contact with the projections of the cam. The expansion may thus be readily adjusted. The compressed and already-heated air admitted through the valve D enters the passages controlled by the valve 23, where it is divided into two currents, so as to pass into the channels 24 and 26 in relative proportions, varying according to the position of the said valve. The air passing through channel 24 enters a channel 25 and flows into the furnace, so as to be discharged upon the declivity of the fuel, while the remaining air passing through passage 26 enters the furnace above the fuel. The meeting of the two currents insures the proper combustion of the gases.

The valve 23 is connected to a lever 27, loaded with a weight 28 and acted upon by a spring 29. This lever, turning on a fixed center 30, presses against a flexible diaphragm 31, which is in communication with the chamber R and constantly tends to expand under the pressure which the air exercises upon it. When the pressure in the reservoir begins to diminish, the said diaphragm accordingly tends to lower under the action of the counter-balance and spring, and this motion of the diaphragm causes the valve 23 to turn on its fixed pivot 32, so as to increase the amount of air traversing the fuel, and thereby to heighten the temperature required for the operation of the engine. The reverse takes place as the pressure approaches its maximum. After the closing of the valve D—*i. e.*, after a period of operation under full pressure—the air admitted into the furnace increases in bulk, thus actuating the motor-piston and bringing about expansion at the expense of its own heat and also of the heat produced by the furnace.

As shown in Fig. 3ᴮ, the space provided above the upper seat of the valve D is placed in communication by the passage 33 with the space under the lower seat of that valve, so that the strain necessary for moving the said valve is reduced to a very low degree.

Having now described my invention, what I claim as new, and desire to secure by Letters Patent, is—

1. In a hot-air engine, the combination, with the cylinder, of a furnace laterally enlarged or having a horizontal extension at its bottom contracted above such enlargement and provided with an air-duct leading to the enlargement and adapted to supply air to the declivity of the fuel therein, substantially as set forth.

2. In a hot-air engine, the combination, with the cylinder and piston having a space around its lower portion, of a fresh-air-supply pipe communicating with said space and a valve adapted to close the same upon the opening of the exhaust, substantially as set forth.

3. In a hot-air engine, the combination, with the cylinder, the piston, and the air-reservoir, of the flexible pipe *t*, the valve *p*, and spring 10, substantially as set forth.

4. In a hot-air engine, the combination, with the governor and admission-valve, of the lever *l*, roller *g*, arms 14, and cam *c*, substantially as set forth.

5. In a hot-air engine, the combination, with the governor and admission-valve, of the cam *c*, roller *g*, arms 14, and a stop to hold the roller from engagement with the small or circular part of the cam, substantially as set forth.

In testimony whereof I have signed this specification in the presence of two subscribing witnesses.

LUCIEN GENTY.

Witnesses:
 W. TORY,
 R. J. PRESTON.